INVENTORS
H. HERLACH
R. STADELMANN
W. ROSSMANITH

INVENTORS
H. HERLACH
R. STADELMANN
W. ROSSMANITH

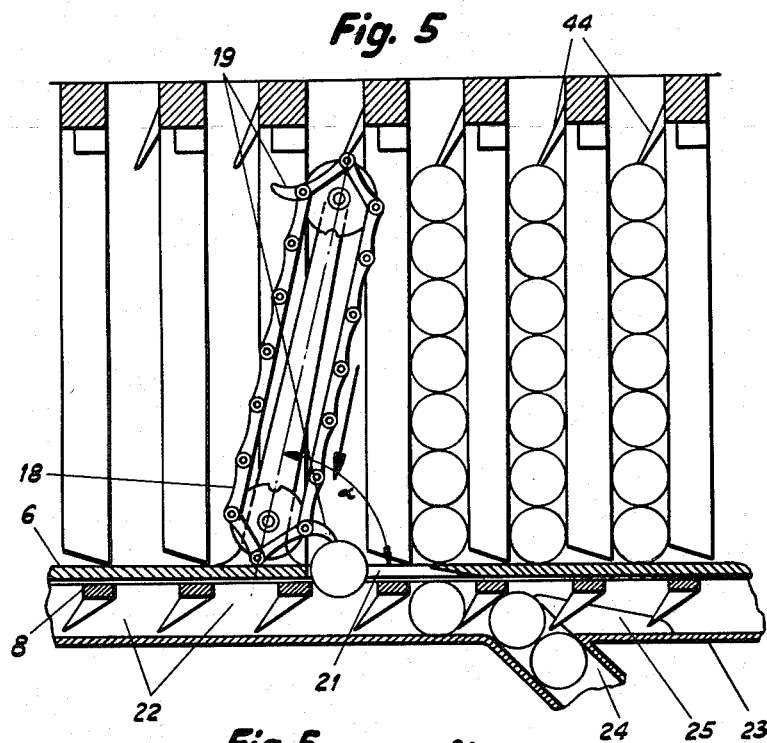

Nov. 3, 1959

H. HERLACH ET AL 2,910,917

DRUM MAGAZINE FOR AUTOMATIC FIRE ARMS

Filed Aug. 13, 1956

INVENTORS
H. HERLACH
R. STADELMANN
W. ROSSMANITH

Nov. 3, 1959  H. HERLACH ET AL  2,910,917
DRUM MAGAZINE FOR AUTOMATIC FIRE ARMS
Filed Aug. 13, 1956  8 Sheets-Sheet 6

INVENTORS
H. HERLACH
R. STADELMANN
W. ROSSMANITH

BY *Wenderoth, Lind & Ponack*
Attys.

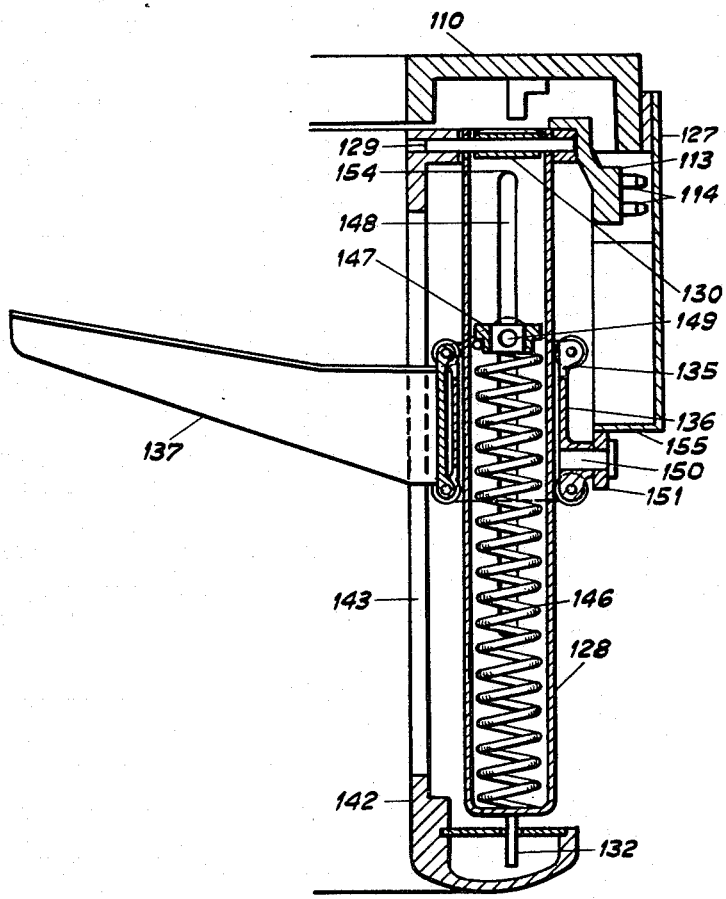

Nov. 3, 1959   H. HERLACH ET AL   2,910,917
DRUM MAGAZINE FOR AUTOMATIC FIRE ARMS
Filed Aug. 13, 1956   8 Sheets-Sheet 8
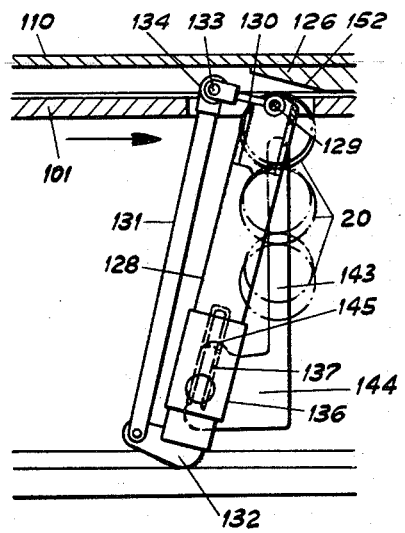
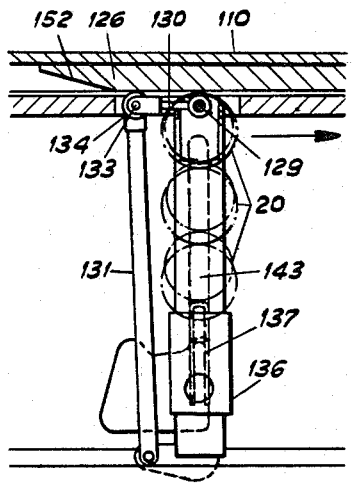
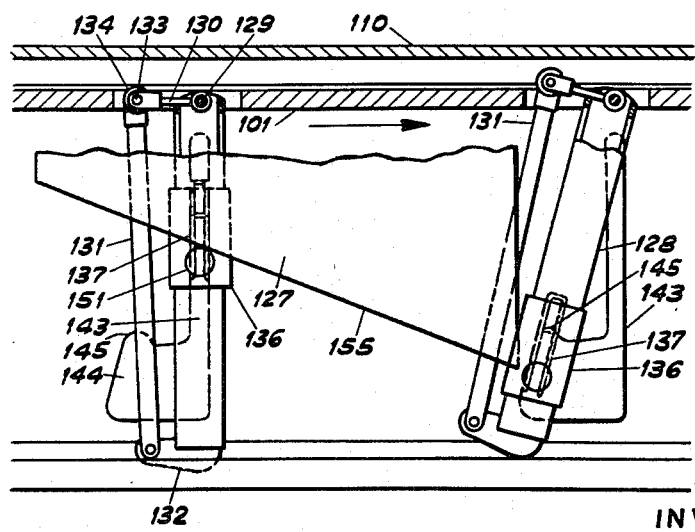
INVENTORS
H. HERLACH
R. STADELMANN
W. ROSSMANITH

United States Patent Office 2,910,917
Patented Nov. 3, 1959

2,910,917
DRUM MAGAZINE FOR AUTOMATIC FIRE ARMS

Heinrich Herlach and Rudolf Stadelmann, Zurich, and Wolfgang Rossmanith, Wabern, Bern, Switzerland, assignors to Machine Tool Works Oerlikon, Administration Company, Zurich-Oerlikon, Switzerland, a company of Switzerland Application August 13, 1956, Serial No. 603,472

Claims priority, application Switzerland August 16, 1955

4 Claims. (Cl. 89—33)

The invention relates to a drum magazine for automatic fire arms in which the cartridges are stored in radially arranged chambers which are discharged in succession by means of a conveyer device upon rotation of the magazine about its axis.

In known drum magazines of this kind the magazine drum had to be taken off the fire arm for the purpose of being re-filled with cartridges. The cartridges can then be pushed into the individual chambers at the end faces thereof against the pressure of springs, special means being provided such as pawls which prevent the said cartridges from being pushed out again by the said springs. When the magazine is fitted to the fire arm, the individual chambers are discharged one after the other through the insertion aperture into the feeder loading the weapon, the magazine rotating stepwise about its axis as soon as one chamber is emptied completely.

It is a main object of the present invention to provide a drum magazine which need not be taken off the fire arm for the purpose of being re-filled with cartridges.

With this and other objects in view we provide a drum magazine mechanism for automatic fire arms, comprising in combination: a base plate, a magazine drum rotatably journalled on and closed at one end by the said base plate and having chambers open at their ends facing away from the said base plate for the insertion of piles of cartridges in a direction parallel to the axis of rotation of the said drum, and a conveyer device mounted on the said base plate and extending into the interior of the said drum adapted to engage a pile of cartridges and to expel the latter successively through a discharge aperture arranged radially in the said base plate.

The said conveyer device may comprise sprocket wheels journalled on the said base plate, endless conveyer chains circulating over the said sprocket wheels at an angle defined by the resultant of their own speed of circulation and the circumferential speed of the said drum, and hooks mounted on some of the links of the said chains. Alternatively the said conveyer device may comprise a pair of gripper arms pivoted on the said base plate and coupled to one another for oppositely directed rocking movement and to the said magazine drum. Either the said hooks or the said gripper arms engage the cartridge remotest from the said base plate of a pile of cartridges thereby pressing the whole pile in a direction towards the said base plate, and expelling the cartridge adjacent the said base plate through the said discharge aperture.

In another embodiment of the drum magazine mechanism according to the invention, a cartridge conveyer arm is mounted slidably and pivotally in each chamber of the magazine drum and biased by spring means towards said base plate, forcing the pile of cartridges in its associated chamber successively through an aperture in said base plate, a curved control rail fixed to the said base plate engaging the said conveyer arm in the sense of restoring the same to its initial positon after the completion of its conveying movement and thereby loading its biasing spring, and rocking the said arm out of its chamber into a position allowing the insertion of cartridges into said chamber, a further curved control rail rocking the said arm back into its conveying position shortly before its chamber reaches the said discharge aperture.

Loading frames containing a number of cartridges corresponding to the capacity of the chambers are conveniently used for loading the same.

These and other objects and features of the invention will be clearly understood from the following description of some embodiments and modifications thereof given by way of example with reference to the accompanying drawings, in which:

Fig. 5 is a part-section as Fig. 4, but in the position in which the last cartridge is being discharged from a chamber.

Figs. 6 and 7 show a modification of the cartridge conveyer device in two phases of conveying, respectively.

Fig. 12 is a section through the feeder with control rail, on the line XII—XII of Fig. 8.

Fig. 13 is an elevation viewed in the direction A of Fig. 8 in part-section through the axis of rotation of the feeder.

Fig. 14 is an elevation in the direction B of Fig. 8 in part-section on the line XIV—XIV of Fig. 9.

Fig. 15 is an elevation of the two feeders at the points D and E, respectively, of Fig. 8, with part-sections through the axis of rotation of the feeder.

Figure 1:
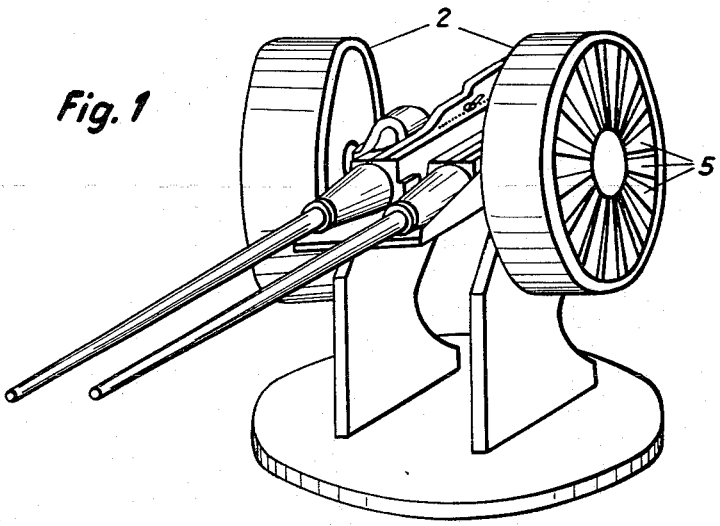
Fig. 1 shows the arrangement of two drum magazines according to the invention fitted to a double-barralled gun.
Figure 2:
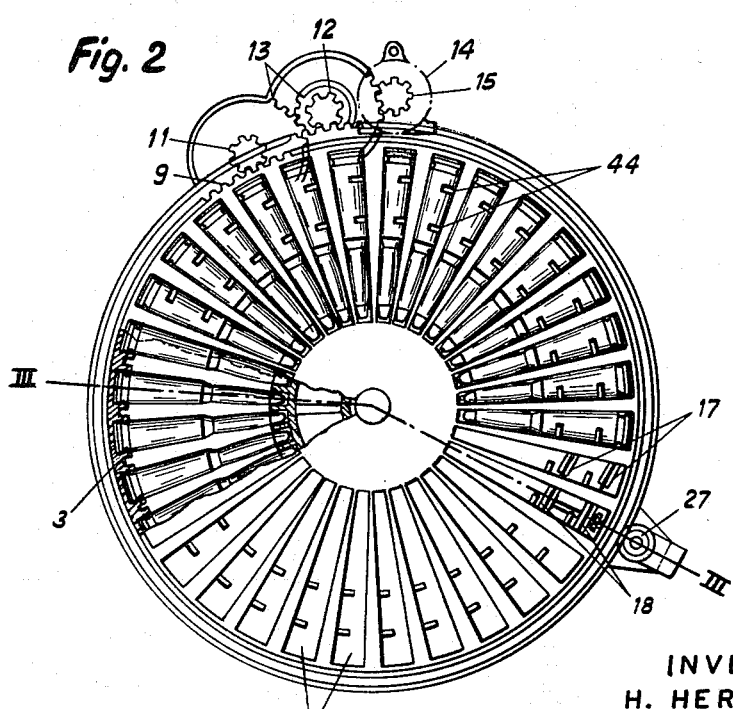
Fig. 2 shows a partly filled magazine as viewed from the side of insertion of the cartridges, partly in elevation, partly in section.

On an axle 1 fixedly mounted on the gun, a bell-shaped cylindrical drum 2 is journalled rotatably. The same comprises on the inside of its outer wall and on the outside of its inner wall guide rails 3 and 4, respectively, arranged parallel to the axis of the drum, for the piles of cartridges 20, and has in its outer end wall radial insertion slots 5, through which the cartridges can be introduced into the guide rails. At the side of insertion the cartridges are secured against dropping out by retaining pawls 44. A plate 6 connected to the fixed axle 1 closes the end face of the drum opposite the insertion slots 5. On the plate 6 a cartridge conveyer device 7 is arranged so as to project into the bell-shaped portion of the drum 2, which device is in driving connection with a cartridge conveyer disc 8, likewise rotatably mounted on the axle 1. This disc has radial slots 22, each for carrying along one of the cartridges expelled from the conveyer device 7. The drum 2 and conveyer disc 8 are provided with spur gear toothing 9 and 10, respectively, in mesh with spur gears 11, 12, respectively, which in turn are in driving connection with one another through a pair of spur gears 13 (see Fig. 2). An electric motor 14, on the shaft of which a pinion 15 is mounted, drives through the pair of spur gears 13 and the spur gears 11, 12 the drum 2 and the conveyer disc 8 at a certain transmission ratio and in the opposite sense of rotation.

Figure 4:
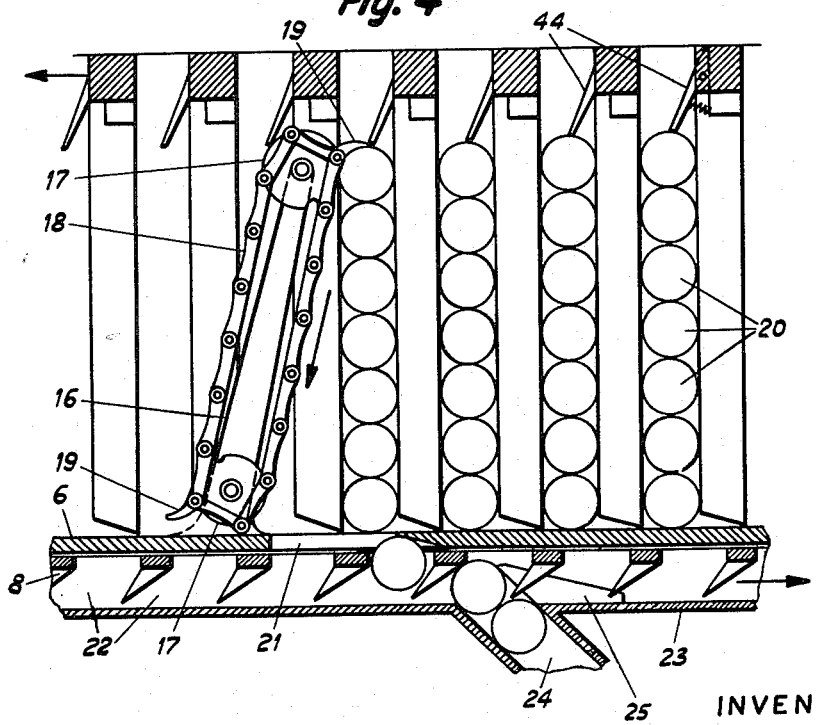
Fig. 4 is a developed part-section through the magazine with the cartridge conveyer device in a position in which the last cartridge of a chamber is engaged.

The base 16 of the conveyer device 7 is fixedly connected to the base plate 6. It forms the bearing bracket for the sprocket wheels 17 of two endless conveyer chains 18. Two of the chain links of these conveyer chains are provided with gripper hooks 19 (Figs. 4 and 5) which at any time engage the last cartridge of a pile of cartridges 20 and push the whole pile out through a slot 21 in the plate 6. Each cartridge then drops into a slot 22 of the conveyer disc 8 for being carried along thereby. This disc is covered on its opposite side by a cover plate 23, which has a single outlet aperture issuing into a duct 24. The cartridges conveyed by the conveyer disc to this outlet aperture are there deflected by deflector noses 25 into the outlet duct 24 and passed on to the point of consumption.

Figure 3:
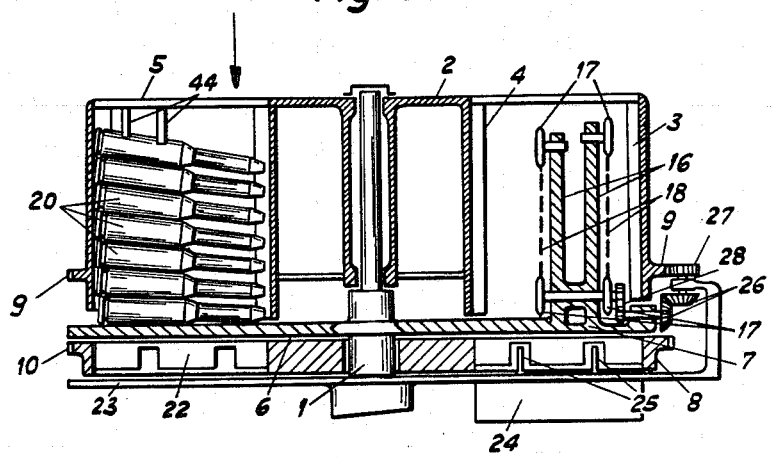
Fig. 3 shows a section through the axis of the magazine on the line III—III of Fig. 2.

The drive of the conveyer chains 18, the conveyer speed of which must be in a definite ratio to the rotational speed of the drum 2, is effected directly from the drum 2 through toothed gearing. The toothing 9 meshes with a spur gear 27 the movement of which is transmitted through a pair of bevel gears 26 and a pair of spur gears 28 at a suitable transmission ratio to the sprocket wheels 17 of the conveyer chains 18 (Fig. 3). The conveyer chains are inclined an angle α with respect to the fixed plate 6 as shown in Fig. 5. This angle is determined by the direction of the resultant movement of the cartridges when being pushed out of their guides 3 and 4, respectively, which can be ascertained on the one hand from the uniform rotary movement of the drum and on the other hand from the movement of the cartridges in that chamber which actually is in the process of being discharged.

Figure 7:
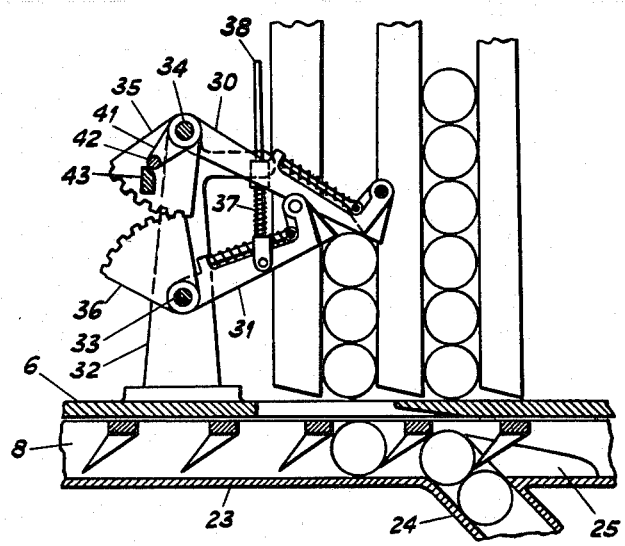

The Figs. 6 and 7 show a second modification of the cartridge conveyer device. Instead of conveyer chains two gripper arms 30, 31 are used for discharging the cartridges from their chambers. These arms are pivotally mounted by means of pins 33 and 34, respectively, on a bracket 32 fixed to the plate 6. The gripper arm 30 is moreover connected to a toothed segment 35 which meshes with a corresponding toothed segment 36 attached to the gripper arm 31. The movements of the two rocker arms are accordingly forcibly coupled to one another. The gripper arm 31 is forced by a compression spring 37 into the rest position as shown in Fig. 6, whereby the arm 30 coupled to it by the toothed segments 35, 36 likewise assumes the position shown in Fig. 6, in which it can engage the uppermost cartridge of a pile. The compression spring 37 abuts on an auxiliary arm 39 mounted on a bracket 32, and is guided by a rod 38, which is articulated to the gripper arm 31 and is slidably mounted in a slide bearing 40 on the auxiliary arm 39. On the gripper arm 30 moreover a lever 41 is mounted, which is directed vertically downward and has an abutment 42. The drive of this feeder device is effected by dogs 43 attached to the drum 2, the number of which corresponds to that of the cartridge chambers. The dogs 43 rotating with the drum 2 engage the abutment 42 and rock the lever 41 in their direction of movement. Thereby the gripper arm 30 is forced downward into the position shown in Fig. 7 in which the abutment 42 can slide past the dog 43. By this rocking movement of the gripper arm the first four cartridges of the chamber are expelled into the conveyer disc 8, and at the same time the gripper arm 31 is turned into the position of readiness as shown in Fig. 7. As soon as the dog 43 clears the abutment 42, the pre-loaded spring 37 forces again the gripper arm 31 into its initial position, whereupon the remaining cartridges are moved out of the chamber. At the same time the gripper arm 30 rocks again into its initial position, whereafter the next dog 43a runs against the abutment 42, and the cycle begins anew. The two gripper arms 30, 31 are provided at their forward ends with spring-biased pivoted pawls 30a and 31a, respectively. Thereby any jamming of the gripper arms on the cartridge which actually runs up against the gripper arm is prevented.

Figure 8:
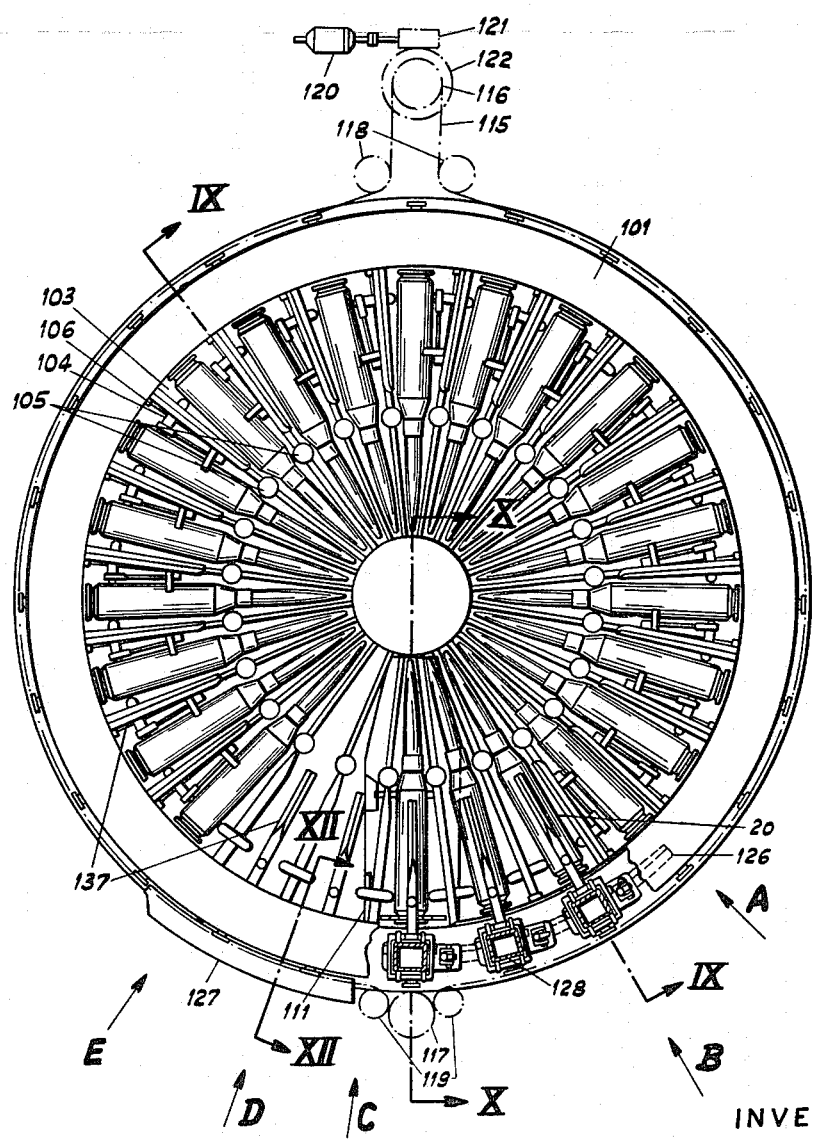
Fig. 8 shows another embodiment of the magazine as viewed from the side of insertion of the cartridges, partly in elevation, partly in section.
Figure 9:
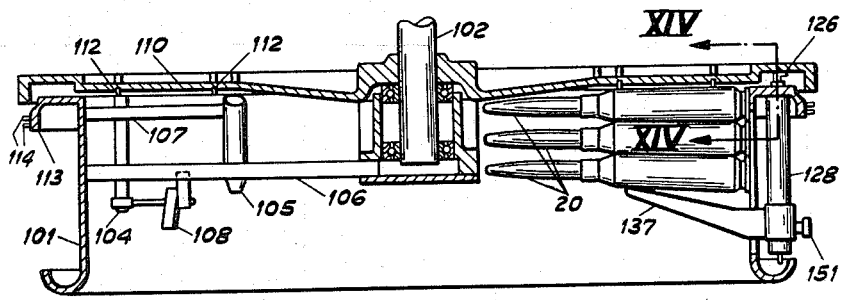
Fig. 9 is a section through the axis of the magazine on the line IX—IX of Fig. 8.
Figure 10:
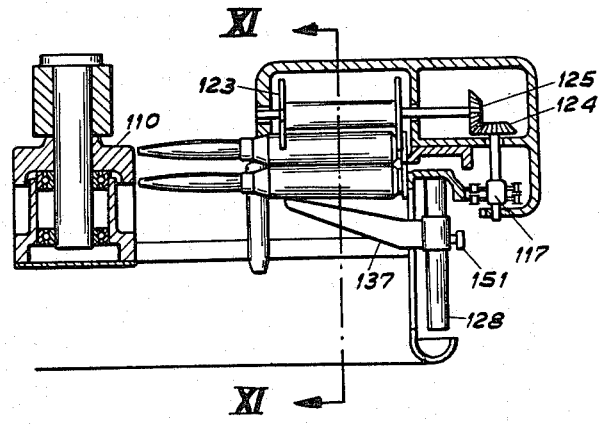
Fig. 10 is a section through the chamber in the process of being discharged, with the cartridge conveyer wheel, on the line X—X of Fig. 8.

In a second embodiment of the invention according to Figs. 8 and 9 a drum 101, open at both end faces, is rotatably mounted on the axle 102 which is fixed to the gun. The individual radially positioned cartridge chambers 103 are formed by guide tubes 104 and 105 arranged parallel to the axis of the drum, which tubes are held by spokes 106, on which retaining pawls 108 are mounted, and by tubes 107 fixed radially to the drum. The drum is closed at the rear end face by a plate 110 which is likewise fixed relative to the gun and centered on the axle 102, which plate has an aperture 111 through which the cartridges 20 are expelled from their chambers. The further conveying of the cartridges is taken over in this case by a conveyer wheel 123. On the plate 110 circular concentrically mounted slider rails 112 for the cartridges 20 are inserted. On the crown 113 of the drum pairs of teeth 114 are arranged at regular distances which teeth engage into the driving chain 115 which surrounds the whole drum, this chain being guided over sprocket wheels 116 and 117 as well as over the pairs 118 and 119 of tensioning wheels. A motor 120 drives through the worm 121 and the worm wheel 122 the sprocket wheel 116 keyed to the shaft of the latter, and thereby drives the chain 115 and drum 101. The cartridge conveyer wheel 123 (Figs. 10 and 11) is in a certain ratio of rotational speed to the drum in driving connection with the chain 115, through the bevel gears 124 and 125 and the sprocket wheel 117. Two control members for the conveyer device, namely the two control rails 126 and 127, are screwed to the plate 110.

Each chamber has a so-called feeder according to the following description associated with itself as a conveyer device for the cartridges (Figs. 8 and 12). A square guide tube 128 is pivotally mounted on an axle 129 on which also an arm 130 is articulated (Fig. 15). A rod 131 is articulated on the one hand to an arm 132 welded to the guide tube 128, and on the other hand to the arm 130. On the pivot pin 133 moreover a roller 134 is journalled.

On a carriage 136 slidably mounted by means of rollers 135 on the guide tube 128 an arm 137 is fixed which extends into the interior of the drum through a slot 143 passed parallel to the axis of the drum through the skirt 142 of the drum, which slot is enlarged towards the side at which the magazine is filled into an aperture 144 having a rest 145 (Figs. 13–15). The middle of this slot 143 coincides with the radial middle plane of the chamber concerned. The pressure of a spring 146 arranged in the interior of the guide tube 128 is transmitted through a slider piece 147 and a pin 149 extending across the slots 148 on to the carriage 136 and accordingly on to the arm 137. On the axle 150 fixed to the carriage a roller 151 is journalled.

The manner of operation of the feeder is as follows: Upon rotation of a chamber in the clockwise direction from the point E to A (Fig. 8) the cartridges 20 are secured against being shifted towards the side of insertion of the drum only by the retainer pawls 108, while the arm 137 biased by the spring 146 of the feeder associated with the chamber concerned rests on the rest 145 of the skirt of the drum. Thus practically no friction losses by the sliding of the first cartridge of the pile on the rails 112 are caused.

Figure 11:
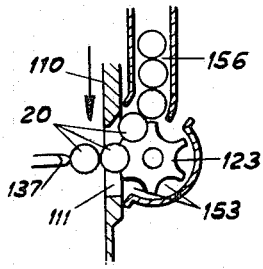
Fig. 11 is a section on the line XI—XI of Fig. 10.

On the path from A to B (Fig. 8) the roller 134 runs up a face 152 of a guide rail 126 (Fig. 13) and turns the feeder by the rod 131 into the position shown in Fig. 14, and accordingly the arm 137 from the rest position into juxtaposition with the slot 143, whereby the arm 137 now bears on the last cartridge of the pile of cartridges. As soon as the latter has arrived in front of the aperture 111 in the plate 110, the cartridges are forced in succession, during the rotation of the drum, into the recesses 153 of the cartridge conveyer wheel 123, which rotates synchronously with the drum, and further into a duct 156 (Fig. 11). When the chamber is emptied, the movement of the arm 137 is stopped by impact of the pin 149 on the end of a slot 154.

On the path from C to E (Fig. 8) the chamber is again made ready for receiving cartridges in that the roller 151 runs up the sloping face 155 of a guide rail 127 (Fig. 15), pushing back thereby the carriage 136 with the arm 137, and loading the spring 146. As soon as the arm 137 is no longer guided in the slot 143, the feeder rocks, under the action of the reaction force acting on the roller 151, about the axle 129, until the arm 137 snaps again into the rest 145, when the roller has run past the highest point of the guide rail 127. Thereby the chamber is made ready again for receiving cartridges.

While we have herein described and illustrated in the accompanying drawings what may be considered typical and particularly advantageous embodiments of our said invention, we wish it to be understood that we do not limit ourselves to the particular details and dimensions described and illustrated, for obvious modifications will occur to a person skilled in the art.

What we claim as our invention and desire to secure by Letters Patent, is:

1. A drum magazine mechanism for automatic firearms comprising in combination a base plate having a discharge aperture arranged radially therein, a magazine drum journalled for rotation about an axis normal to said base plate, said drum being closed at one end by said base plate and open at the other end away from said base plate, driving means imparting a continuous rotation to said drum, guide rails supported by said drum and arranged parallel to said axis, a plurality of radially extending cartridge chutes, each chute being provided with a filling aperture adjacent to the open end of said drum, said guide rails limiting the lateral width of each of said chutes to substantially the thickness of the cartridges, retaining pawls for the cartridges disposed adjacent to said filling apertures, a conveyer device comprising expelling means for the cartridges, said expelling means extending into the interior of said drum and being movable substantially along one of said chutes to move the cartridges from the filling aperture of the chute towards said base plate, and movement transmitting means connecting said drum with said conveyer device to drive the latter in timed relation to the rotation of said drum.

2. A drum magazine mechanism for automatic firearms, comprising in combination: a base plate having a discharge aperture arranged radially therein, a magazine drum rotatably journalled on and closed at one end by said base plate and open at the other end away from said base plate for the insertion of piles of cartridges, driving means imparting a continuous rotation to said drum, guide rails for the piles of cartridges arranged parallel to the axis of rotation, a plurality of radially extending cartridge chutes, each chute being provided with a filling aperture adjacent to the open end of said drum, said guide rails limiting the lateral width of each of said chutes to substantially the thickness of the cartridges, retaining pawls for the cartridges, a first conveyer device mounted on said base plate and extending into the interior of said drum comprising a pair of gripper arms pivoted on said base plate about axes arranged at different distances from and parallel to the face thereof, coupling means coupling said gripper arms to one another for oppositely directed rocking motion, and other coupling means coupling one of said gripper arms to said rotatable magazine drum, said gripper arms engaging the cartridge remotest from said base plate and thereby pressing the whole pile of cartridges in a direction towards said base plate and expelling the latter successively through said discharge aperture and a conveyer disc rotatably mounted on the side of the base plate facing away from said drum and in driving connection therewith, said conveyer disc receiving successively the cartridges expelled through said discharge aperture in said base plate.

3. A drum magazine mechanism for automatic fire arms comprising in combination: a base plate, a magazine drum rotatably journalled on and closed at one end by said base plate and having chambers open at their ends facing away from said base plate for the insertion of piles of cartridges in a direction parallel to the axis of rotation of said drum, driving means imparting a continuous rotation to said drum, retaining pawls for the cartridges, a cartridge conveyer arm mounted slidably and pivotally on said magazine drum in each of said chambers and engaging the cartridge of the pile contained in its associated chamber remotest from said base plate, spring means biasing each of said conveyer arms in a direction towards said base plate, a discharge aperture for said cartridges provided in said base plate, a curved control rail fixed to said base plate engaging said cartridge conveyer arms in the sense of restoring the same to their initial positions after the completion of their conveying movement and thereby loading the biasing springs thereof, and rocking the said conveyer arms out of their associated chambers into a position allowing the refilling of the latter with cartridges from the side facing away from said base plate, and a further curved control rail mounted on said base plate engaging said conveyer arms and rocking the same back into their conveying position inside their associated compartment shortly before the same has reached said discharge aperture and a cartridge conveyer wheel mounted on the side of said base plate facing away from said drum and in driving connection therewith, said conveyer wheel receiving successively the cartridges expelled by said conveyer arms through said discharge aperture.

4. A drum magazine mechanism for automatic fire arms comprising in combination a base plate having a discharge aperture arranged radially therein, a magazine drum journalled for rotation about an axis normal to said base plate, said drum being closed at one end by said base plate and open at the other end away from said base plate, driving means imparting a continuous rotation to said drum, guide rails supported by said drum and arranged parallel to said axis, a plurality of radially extending cartridge chutes, each chute being provided with a filling aperture adjacent to the open end of said drum, said guide rails limiting the lateral width of each of said chutes to substantially the thickness of the cartridges, retaining pawls for the cartridges disposed adjacent to said filling apertures, a conveyer device mounted on said base plate and extending into the interior of said drum comprising sprocket wheels journalled at different distances on said base plate about axes parallel to the face thereof, endless conveyer chains having links circulating over said sprocket wheels at an angle to said base plate defined by the resultant of their own speed of circulation and the circumferential speed of said drum, hooks mounted on certain of said links, one of said hooks engaging the cartridge remotest from said base plate and thereby pressing the whole pile of cartridges in a direction towards said base plate and expelling the latter successively through said discharge aperture and a conveyer disc rotatably mounted on the side of said base plate facing away from said drum and in driving connection therewith, said conveyer disc receiving successively the cartridges expelled through said discharge aperture in said base plate.

References Cited in the file of this patent

UNITED STATES PATENTS

| | | |
|---|---|---|
| 681,439 | Carr | Aug. 27, 1901 |
| 1,552,863 | Methlin | Sept. 8, 1925 |
| 2,113,793 | Larsson et al. | Apr. 12, 1938 |
| 2,180,741 | Lisov | Nov. 21, 1939 |
| 2,756,637 | Maillard | July 31, 1956 |

FOREIGN PATENTS

| | | |
|---|---|---|
| 1,071,266 | France | Nov. 27, 1952 |